(12) United States Patent
Casper

(10) Patent No.: US 7,127,427 B1
(45) Date of Patent: Oct. 24, 2006

(54) SECURE TRANSACTION PROCESSING SYSTEM AND METHOD

(76) Inventor: Andrew Casper, 5 Meadow La., Kinnelon, NJ (US) 07405

( * ) Notice: Subject to any disclaimer, the term of this patent is extended or adjusted under 35 U.S.C. 154(b) by 0 days.

(21) Appl. No.: 09/521,636

(22) Filed: Mar. 8, 2000

Related U.S. Application Data

(60) Provisional application No. 60/157,774, filed on Oct. 5, 1999.

(51) Int. Cl.
*G06F 17/06* (2006.01)

(52) U.S. Cl. .......................................... 705/44; 705/41
(58) Field of Classification Search ................ 705/57, 705/63, 64, 65, 35–41, 44, 53; 235/379, 235/380
See application file for complete search history.

(56) References Cited

U.S. PATENT DOCUMENTS

| | | | |
|---|---|---|---|
| 4,947,028 A | 8/1990 | Gorog | |
| 5,223,699 A | 6/1993 | Flynn et al. | |
| 5,283,731 A | 2/1994 | Lalonde et al. | |
| 5,710,887 A | 1/1998 | Chelliah et al. | |
| 5,729,594 A | 3/1998 | Klingman | |
| 5,754,656 A | 5/1998 | Nishioka et al. | |
| 5,757,917 A | 5/1998 | Rose et al. | |
| 5,794,207 A * | 8/1998 | Walker et al. | 705/1 |
| 5,822,737 A | 10/1998 | Ogram | |
| 5,826,241 A | 10/1998 | Stein et al. | |
| 5,867,495 A * | 2/1999 | Elliott et al. | 705/64 |
| 5,870,717 A * | 2/1999 | Wiecha | 705/26 |
| 5,890,137 A | 3/1999 | Koreeda | |
| 5,898,838 A | 4/1999 | Wagner | 395/200.54 |
| 5,910,896 A | 6/1999 | Hahn-Carlson | 364/479.01 |
| 5,982,891 A * | 11/1999 | Ginter et al. | 705/26 |
| 5,987,429 A | 11/1999 | Maritzen et al. | 705/31 |
| 6,029,150 A | 2/2000 | Kravitz | 705/39 |
| 6,041,315 A * | 3/2000 | Pollin | 705/45 |
| 6,049,785 A * | 4/2000 | Gifford | 705/39 |
| 6,188,994 B1 * | 2/2001 | Egendorf | 705/40 |
| 6,233,565 B1 * | 5/2001 | Lewis et al. | 705/35 |
| 6,332,134 B1 * | 12/2001 | Foster | 705/39 |

FOREIGN PATENT DOCUMENTS

| | | | |
|---|---|---|---|
| WO | WO 99/45693 | * | 9/1999 |
| WO | WO 00/02150 | * | 1/2000 |

OTHER PUBLICATIONS

Edwards, "Education is weapon against credit fraud", Travel Weekly, v53, n91, p80(1), Nov. 17, 1994, Dialog File 148, Accession No. 07604387.*
Universally Secure, (AT&T will launch new SecureBuy service that allows cardholders to make secure Internet purchases using their AT&T Universal Cards), Card Fax, v96, n180, p2, Oct. 9, 1996, Dialog file 9, Accession No. 01076638.*
PCT Notification of Transmittal of International Preliminary Examination Report and International Preliminary Examination Report dated Sep. 23, 2002.

* cited by examiner

*Primary Examiner*—Frantzy Poinvil
(74) *Attorney, Agent, or Firm*—Stroock & Stroock & Lavan LLP

(57) ABSTRACT

A processing system and method for processing purchase orders between a purchaser and a merchant across a public network. The processing system comprising a purchaser account database for storing purchaser account information for each purchaser and including at least a purchaser identifier and delivery data associated with the purchaser identifier, a disabler for monitoring the status of the purchaser account database and disabling the account database in response to a monitored change in the purchaser account information, and a processor for receiving the purchase orders and processing the orders.

23 Claims, 6 Drawing Sheets

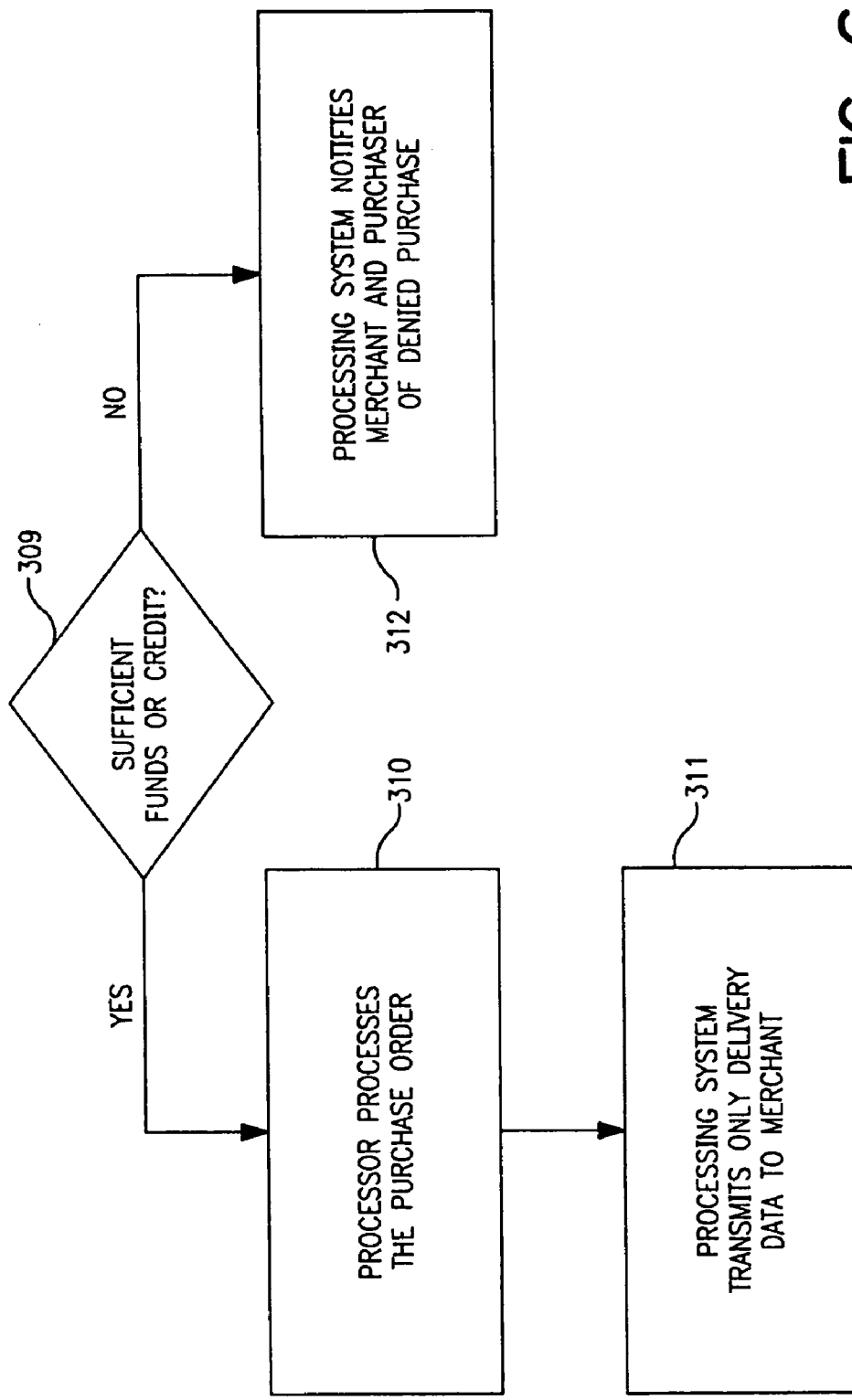

SECURE TRANSACTION PROCESSING SYSTEM AND METHOD

This Application claims priority under 35 U.S.C. § 119(e) to U.S. Provisional Application Ser. No. 60/157,774, filed on Oct. 5, 1999.

FIELD OF THE INVENTION

The present invention relates to an improved system and method for providing secure transactions over various means of communication, and in particular to a system and method for protecting a consumer's valuable payment information from theft or fraudulent use.

BACKGROUND OF THE INVENTION

Electronic shopping, commonly referred to as e-commerce, has revolutionized how consumers purchase goods and information from merchants. Through the Internet and, more recently, the personal data assistant ("PDA") and the wireless phone, merchants are able to bring their products into the living room (and hands) of the consumer. This ability to reach the consumer has produced a financial windfall for both new start-ups and more traditional brick-and-mortar companies.

Security concerns, however, are among the most important issues confronting today's electronic shopping models. Because most of these transactions are completed using credit or debit cards, there exists a danger that valuable information could be misappropriated.

Unlike traditional telephone and in-store credit card processing machines, today's wireless and Internet-related communications mediums do not provide adequately secure means for transmitting sensitive data. Traditional telephone communications on a "hard-line" use switched networks to offer a certain measure of security, because the caller is connected directly to the receiver by physically switching nodes until a caller-to-receiver network is created. Traditional telephone communications, however, fail to remedy the security concerns facing today's Internet and wireless communications.

Attempts have been made that are known in the art to make Internet and wireless transactions secure. With respect to Internet transactions, attempts have been made to encrypt credit card and debit card information. Although most consumers use a switched network to dial-in to the Internet, once data reaches the nodal network, the data is transmitted in packets. The packets are routed from a source Internet Protocol Address ("IP Address") through a nodal layer, commonly referred to as the TCP/IP layer, until the destination IP Address is reached. Because both the source and destination addresses can be manipulated, changed, or intercepted, data carried in packets, such as financial information, can be re-routed and misappropriated.

To combat these security problems a Secure Sockets Layer ("SSL") can be substituted for the standard TCP/IP layer. The SSL stands between the purchaser and the server permitting the secure transmission of data packets. To enable the secure transmission a merchant must obtain a Digital Certificate, such as those provided by VeriSign, Inc., that is acceptable to the purchaser's web browser. This is to ensure that the party receiving the data is actually the merchant the purchaser wishes to contact. Once the certificate is verified, the data is encrypted and transmitted to the merchant. The SSL arrangement, however, cannot confirm the integrity of the certified merchant or ensure that the merchant is equipped to prevent leakage of valuable financial information.

In other systems, such as the systems disclosed by Rose et al., U.S. Pat. No. 5,757,917, and Stein et al., U.S. Pat. No. 5,826,241, a payment system receives and sends messages to and from the seller and the buyer regarding a transaction. The messages contain information including the parties' identities, which are represented by a "card number" specific to the party but unrelated to financial information. The payment system then contacts a bank card processor that interacts with credit card companies to complete the transaction. These systems, however, fail to provide security features preventing theft or fraudulent use when computer-hackers learn the parties' "card number" or illegally tap into a computer system storing the credit and debit card information. Moreover, such systems fail to control the delivery component of the transaction. These systems merely concern themselves with billing which may take place after the product has been shipped.

Consequently, security in effectuating such transactions continues to be a problem for companies soliciting electronic purchases. According to a ZDNet article, dated Jan. 12, 2000, a computer hacker gained access to a well-known e-commerce web-site and misappropriated thousands of credit cards. (See http://www.zdnet.com/filters/printer-friendly/0,6061,24211377-2,00.html). The hacker then released the credit card numbers to the public on a web-site. Thus, despite numerous attempts to provide for the secure communication and storage of credit and debit card numbers, theft or fraudulent use of such information remains prevalent.

The Internet, however, is not the only means by which merchants can reach the consumer. Many merchants use multiple channels to communicate product offerings, such as print catalogs, newspaper advertisements, and the like. Consumers viewing these traditional means of advertisement may desire to make purchases electronically while away from home or when access to a hard-line telephone is unavailable. Presently known systems and methods of securing electronic transactions fail to embrace such purchases.

Accordingly, there is need for a system and method that securely stores financial information, such as credit and debit card numbers, and disincentivises theft of information used to make purchases by permitting secure electronic transactions over a variety of communication mediums.

SUMMARY OF THE INVENTION

The present invention is directed to a system and method for providing added security features to electronic commerce transacted over a variety of communication mediums.

According to the present invention, a central transaction processing system acts as both a secure information repository and payment processing center. A party who wishes to purchase merchandise (the "purchaser") sets up an account with the central processing system containing the purchaser's purchasing information, such as payment, billing, and delivery information. The processing system may use presently known technologies, including encryption techniques and multiple firewalls, to securely store the purchaser's valuable purchasing information. Because the purchaser's information for all electronic purchases is held in a central processing system, the purchaser's information is not spread to individual merchants who may or may not be sufficiently capable of securely storing the purchaser's financial information. Thus, costly information leaks due to merchant error are avoided.

A unique purchaser identifier is assigned to each purchaser and linked to that purchaser's purchasing information which is stored in a purchaser account. The identifier—or personal identification number (PIN)—bears no relation to the purchaser's financial information. Only the identifier and the corresponding delivery information is communicated when purchases are made.

In a preferred embodiment, one or more types of delivery addresses may be associated with the purchaser identifier. Such types may include a physical address, electronic address, e-mail address, or any other type of address to which goods/services can be delivered. One skilled in the art will recognize that the physical address may be a residential address, commercial or business address, a Post Office Box address, a private mail address (such as a MailBox, Etc. Address), or the like. In yet another embodiment only one specific address for each particular type of address can be associated with the purchaser identifier. Furthermore, the purchaser identifier and the corresponding purchaser account cannot be changed at any time or by any party, including the purchaser, without that particular purchaser identifier and account being disabled. Once disabled the purchaser identified is void and a new identifier must be issued. The present invention, therefore, prevents unauthorized use of a purchaser's purchasing information by ensuring that any purchases are delivered only to the purchaser's physical or electronic address. Any fraudulent use of the purchaser identifier will be instantly revealed because the goods or electronic information must be delivered directly to the purchaser's delivery address. Because the purchaser will know whether a valid purchase has been made, the purchaser can suspend or disable the account without canceling credit or debit cards.

Once the account with the central processing system is established and credit worthiness verified, the purchaser can make electronic purchases using the purchaser identifier. To effect a transaction the PIN is communicated to a merchant having a merchant account with the processing system. The merchant in turn communicates the PIN and a summary of the proposed transaction (including at least a payment amount) to the processing system for approval.

The processing system generally comprises a purchaser account database, a disabler, and a processor. The PIN along with a purchase order is received by the processing system, which in a preferred embodiment further includes a securitizer to filter the data and to permit only authorized data from being passed to the processor. As such, the integrity of the data (purchaser accounts) stored within the processing component is preserved. The processor uses the PIN to locate the appropriate purchaser account to begin the processing procedure.

If the processor determines that the necessary credit terms are met, the processor communicates only the delivery address associated with the submitted PIN to the merchant. The merchant confirms the transaction with the purchaser and delivers the product to the purchaser's delivery address, completing the transaction. If, however, the credit terms are not met or if the PIN has been disabled, the merchant is notified to cancel the sale and to provide notice to the purchaser.

The disabler operates to disable the purchaser account and invalidate the purchaser identifier in response to any attempt to tamper with the purchaser account and, in particular, with an attempt to alter the delivery address. Once invalidated, a new PIN must be issued to permit use of the purchaser account.

As an added security feature to the present invention, the parties may agree on a return period in which the consumer can freely return unwanted or fraudulently ordered products. The specific length of the return periods depends on the nature of the goods purchased, i.e. physical or electronic products, and the services provided.

Other features of the invention will become clear from the detailed description, considered in conjunction with the accompanying drawing figures. It is to be understood, however, that the drawings are provided solely for the purpose of illustration and not as a definition of the limits or scope of the invention, for which reference should be made to the appended claims.

BRIEF DESCRIPTION OF THE DRAWINGS

In the drawing figures, which are not to scale, and which are merely illustrative, and wherein like reference numerals depict like elements throughout the several views:

FIG. 6 is a flow diagram continuing the steps of FIGS. 4 and 5.

DETAILED DESCRIPTION OF THE INVENTION

Figure 1:
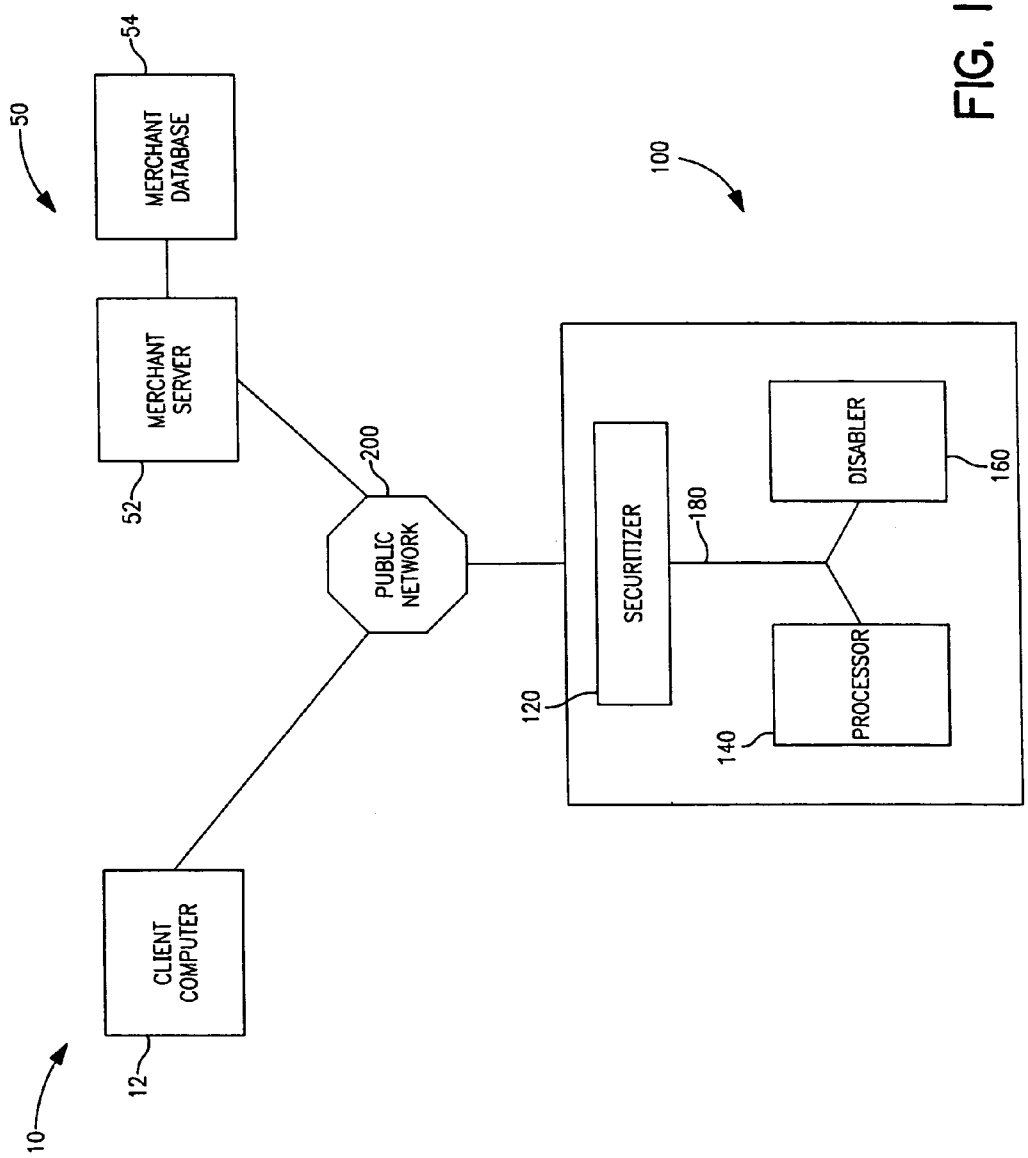
FIG. 1 is a schematic diagram of a processing system according to a preferred embodiment of the present invention in use with a public network and a purchaser and a merchant.

The present invention provides a method and system for completing secure commercial transaction over a variety of communication mediums by preventing the theft and misuse of financial information of purchasers. By centralizing consumer purchasing information in a purchaser account stored on a secure processing system and preventing alterations to the purchaser account, the present invention reduces the likelihood of theft or misuse of the purchaser account.

With reference to FIGS. 1–6, the present invention generally comprises a processing system 100. Processing system 100 is connected to a public network 200 through which it is connected to a purchaser 10 and a merchant 50. Merchant 50 has a merchant server 52 through which it is connected to network 200. Purchaser 10 is connected to public network 200 by purchaser device 12. As will be discussed further, public network 200 is used by the present invention to receive and transmit data according to a process for completing secure transactions.

Processing system 100 generally includes a securitizer 120, a processor 140, and a disabler 160. Securitizer 120 permits processing system 100 to communicate with public network 200 whereby processing system 100 receives purchase orders for processing. Securitizer 120 acts as a firewall between the public network 200 and a secure network 180 on which the processor 140 resides. Processor 140 securely stores purchaser account information 32 for a plurality of purchasers 10 on storage device 103. Purchaser account information 32 is stored behind the firewall provided by securitizer 120. Processor 140 processes purchase orders and, upon completion of the processing step (discussed in detail below), communicates purchaser specific delivery data 34 through securitizer 120 to merchant 50 via public network 200. Disabler 160 disables the processing of purchaser account information 32 in response to any attempt to tamper with the information stored in purchaser account 32, as described further below.

Processing system 100 receives data relating to purchase orders transmitted by either purchaser 10 or merchant 50 through public network 200. In addition, depending upon the particular embodiment of the present invention, processing system 100 transmits delivery data 34 and provides payment to merchant 50 via public network 200. In addition, in a preferred embodiment, as described below, public network 200 may be used by merchant 50 to communicate product information to purchaser 10, although product information may be communicated by any other medium known in the art, such as television, the Internet, WebTV, radio, wireless communications, through PDAs or any other remote communications network. One skilled in the art will recognize also that public network 200 can consist of one communication medium, such as the Internet, or a combination of mediums in use at one time.

Figure 2:
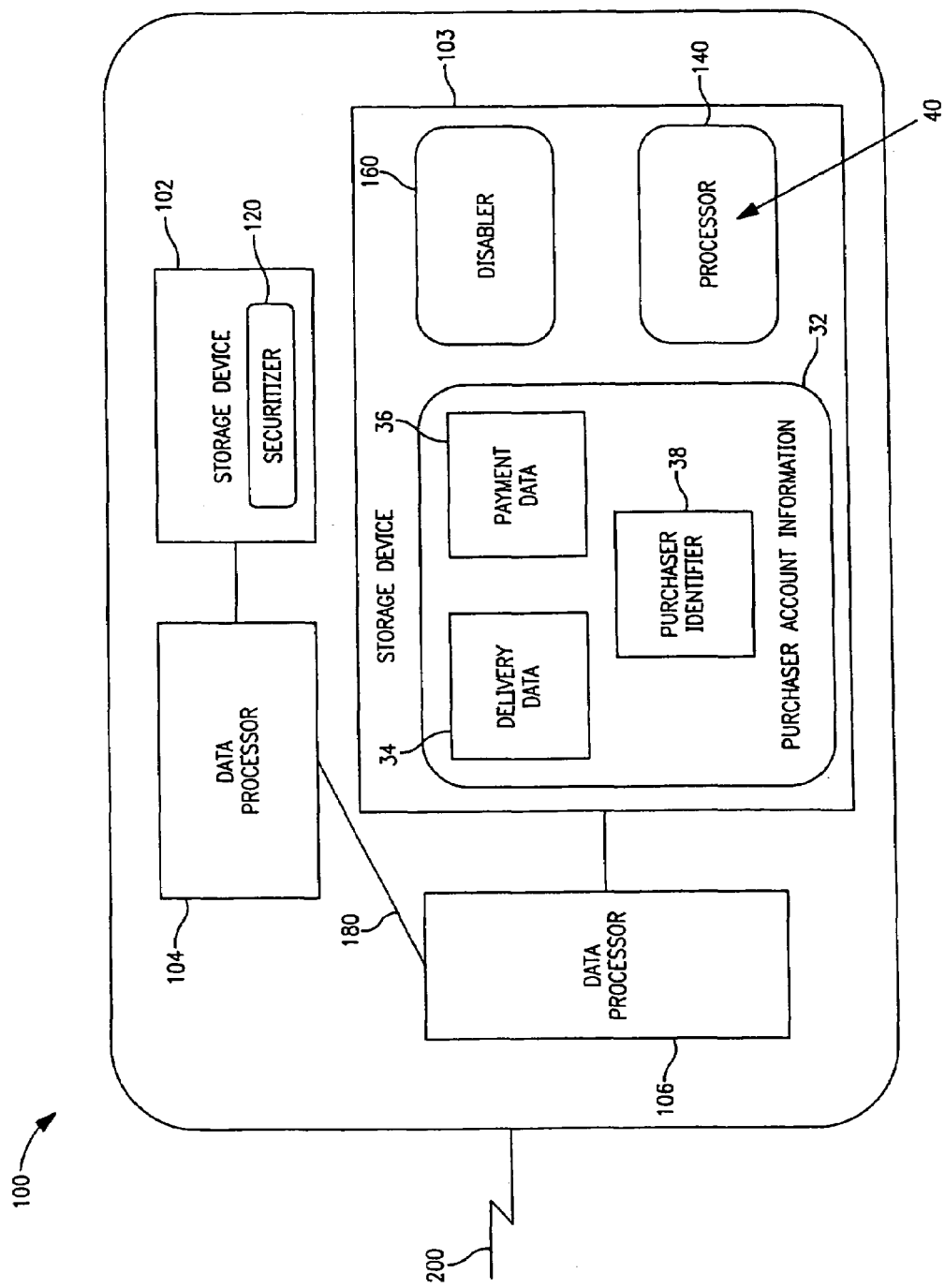
FIG. 2 is a schematic diagram of the processing system of FIG. 1.

With reference now to FIG. 2, there is shown a more detailed figure of the system architecture of the processor system 100. As illustrated in FIG. 1, processing system 100 comprises three components securitizer 120, processor 140, and disabler 160, each of which in a preferred embodiment are programs stored on either storage device 102 or 103 and run by a data processor, such as data processors 104 and 106, for performing a particular task or series of steps. Preferably, securitizer 120 is run by a separate processor 104, which is the only part of processing system 100 in communication with public network 200. Data processor 104, which runs securitizer 120, therefore, is the only part of processing system 100 accessible from an external source.

Securitizer 120 prevents unauthorized hackers from tampering with the information stored on secure network 180. Securitizer 120 as run by data processor 104 may, for example, perform the function of an Application Level Gateway device (firewall) for preventing hackers from infiltrating secure network 180 through public network 200. One skilled in the art will recognize, however, that securitizer 120 may be coded in any way in which the function of preventing misappropriation and tampering is accomplished.

Processor 140 and disabler 160, in contrast, are stored on storage device 103 which reside on secure network 180, which, as a result of securitizer 120, is not easily accessible from public network 200. Processor 140, as run by data processor 106, processes purchase orders received through securitizer 120 using purchaser account information 32 stored on storage device 103. Disabler 160 monitors purchaser account information 32 and, in response to tampering, disables purchaser account information 32 and invalidates the associated purchaser identifier 38, discussed further below.

Referring again to FIG. 2, processor 140 resides behind securitizer 120 on secure network 180. Processor 140 includes purchaser account information 32 and software 40 stored on storage device 103 for processing by data processor 106. Data processors 104, 106 may be any data processor known in the art, including a personal computer, a network workstation, or server, capable of accessing and running software programs stored on storage devices 102, 103. Storage devices 102, 103 may be any hard disc or optical disc device capable of storing data for use with the present invention and compatible with data processors 104, 106. Depending upon the particular application of the present invention, one or more data processors 104, 106 and storage devices 102, 103 may be used in tandem or separately as may be needed as a matter of design choice.

With reference again to FIG. 2, on storage device is stored purchaser account information 32 for a plurality of purchasers. Purchaser account information 32 associated with a respective purchaser 10 includes at least a payment data 36, delivery data 34, and purchaser identifier 38. Payment data 36 is any data utilized for transferring money from one party to another, such as by way of non-limiting example credit card numbers and processing information, debit card number and processing information, wire transfer account numbers, automatic bank draft, cash account numbers with processing system 100, or any other equivalent data. Delivery data 34 is either an electronic address, such as for example an email address or IP address, or a physical address, such as for example the work or home address of purchaser 10. Purchaser identifier 38 is a purchaser assigned alphanumeric code making up the PIN, issued by the service or entity controlling processing system 100, for identifying purchaser 10 and the associated purchaser account information 32. When making purchases, purchaser 10 uses only purchaser identifier 38.

Purchaser identifier 38 is mapped, within processing system 100 to the purchaser's delivery data 34 and payment data 36. When a new purchaser account is opened, purchaser identifier 38 is assigned to purchaser 10 and stored in purchaser account information 32 on storage device 103. Because purchaser identifier 38 is independent of payment data 36 or any other financial information, use of purchaser identifier 38 by purchaser 10 in no way jeopardizes the integrity of any sensitive information stored on storage device 103.

According to the present invention, if any person including purchaser 10, alters or attempts to alter purchaser account information 32, and in particular delivery data 34, purchaser account information 32 is disabled. Disabler 160 is triggered upon such an attempt to alter or tamper with purchaser account information 32. Therefore, when any person attempts to alter delivery data 34 of purchaser account information 32, for example, by either requesting a change in delivery data 34 or attempting to hack into processing system 100 by circumventing the need for purchaser identifier 38, disabler disables purchaser account information 32 by invalidating purchaser identifier 38 or by preventing processor 140 from processing transactions requested based upon specific purchaser account information 32. In addition, at no time during or after the ordering process is purchaser 10 or any other third party given the option to either select or change delivery data 34. In this way, merchant 50 will only be directed to deliver the goods to the address communicated by the processing system 100.

This feature is advantageous because even if purchaser identifier 38 is misappropriated, any attempted purchases will be delivered only to the address relating to delivery data 34. As such, any fraudulent purchases made with purchaser identifier 38 will be instantly known, because purchaser 10 will know whether purchaser 10 used purchaser identifier 38 to make the purchase. On the other hand, a hacker must also intercept the package at the address of the purchaser, disincentivizing the hacker from stealing purchaser identifier 38.

This feature has a further advantage of permitting purchaser 10 to disable the purchaser account information 32 without disabling (or canceling) payment data 36, such as a credit or debit card numbers. Because only purchaser identifier 38 is used in making purchases, payment data 36 is securely and safely stored in processing system 100. If, however, purchaser account information 32 and purchaser identifier 38, do become disabled, a new purchaser identifier 38 must be issued prior to enabling purchaser account information 32.

In a preferred embodiment, one or more types of addresses may comprise delivery data 34 and may be associated with the purchaser identifier 38. Such types may include a physical address, electronic address, e-mail address, or any other type of address to which goods/services can be delivered. One skilled in the art will recognize that the physical address may be a residential address, commercial or business address, a Post Office Box address, a private mail address (such as a MailBox, Etc. Address), or the like. In yet another embodiment, only one specific address for each particular type of address can be associated with the purchaser identifier 38. Furthermore, purchaser identifier 38 and the corresponding purchaser account information 32 cannot be changed at any time or by any party, including purchaser 10, without that particular purchaser identifier 38 and account information 32 being disabled. Once disabled, the purchaser identifier 38 is void and a new identifier must be issued.

Although purchaser account information 32 for numerous purchasers may be in use at any given time, it is useful to illustrate the present invention with reference to use of a single purchaser account information 32 in connection with a single transaction.

Purchase 10 may join and/or register with the processing system 100, which may be controlled and operated by an independent company, a credit service, an electronic cash or wallet service, or a financial institution. One skilled in the art will recognize that purchaser 10 can open an account in any number of ways, including without limitation registering online, by telephone, or by written application. Once an account is opened, purchaser 10 provides processing system 100 with the delivery data 34 and payment data 36 and any other necessary information. Purchaser 10 may then choose a purchaser identifier 38 (PIN) or one may be assigned by processing system 100 and mapped to the delivery data 34 and payment data 36. Use of the purchaser account information 32 is described further below.

Figure 3:
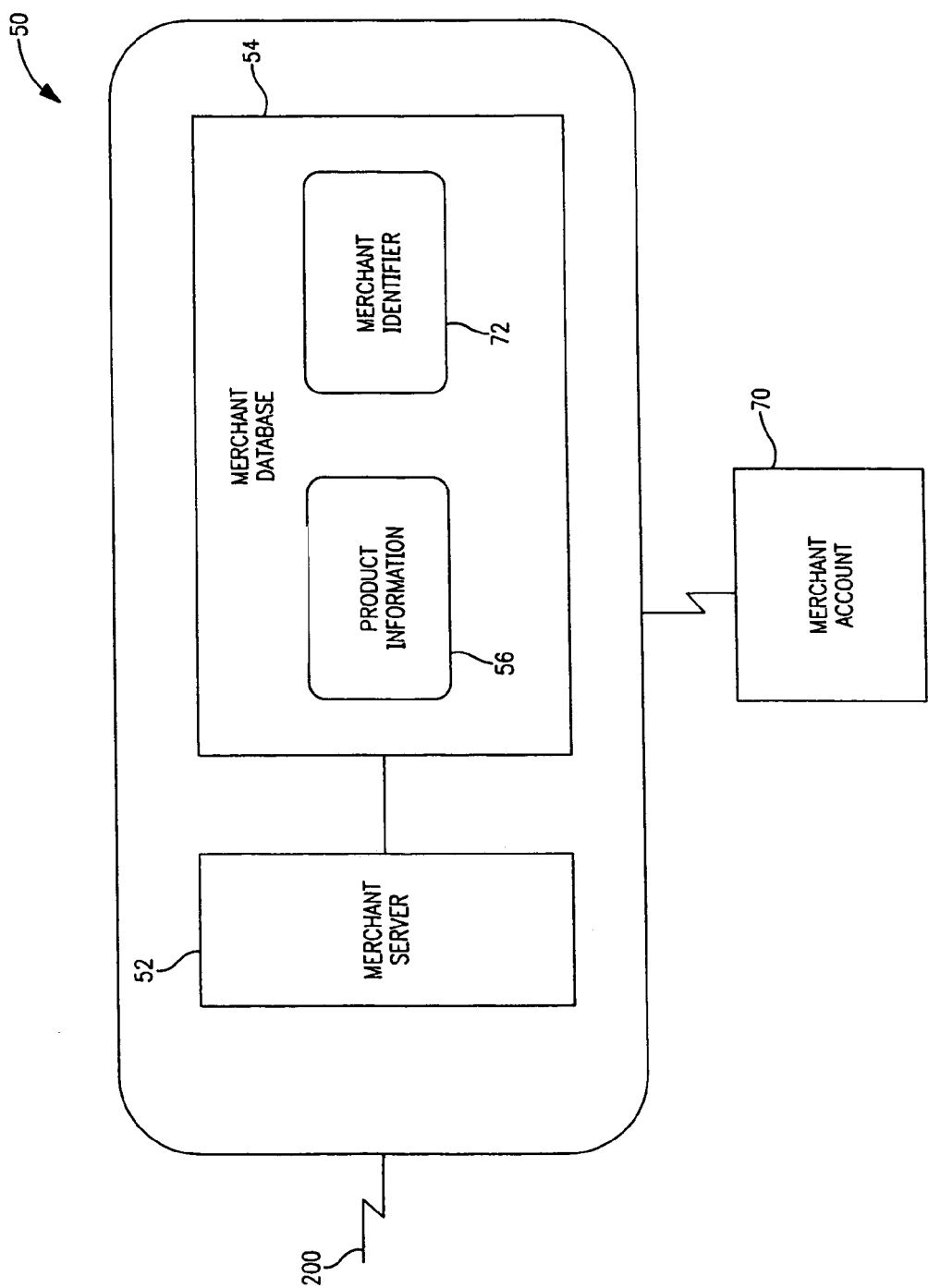
FIG. 3 is an illustration of a merchant system for use with the present invention.

With reference now to FIG. 3, there is shown a more detailed view of the system architecture of merchant 50. Public network 200 is any global network, such as, by way of non-limiting example, the Internet, satellite or wireless communication, or any other personal communication system ("PCS"). With further reference to FIG. 1, purchaser device 12, which is any personal computer, network workstation, PDA, wireless telephone, or other device connectable to public network 200. Through purchaser device 12, purchaser 10 has the ability to search through merchant database 54 maintained by merchant 50 and delivered to public network by merchant server 52 for product information 56 stored on merchant database 54. As used herein, the products for sale may be information products, such as a PC games or other software programs downloadable or otherwise transferable over public network 200 to the address associated with delivery data 34, or any other product capable of being physically shipped to purchaser 10 at a physical address identified by delivery data 34.

Merchant 50 is any entity, persons, or person offering goods or services for sale and having the ability to deliver goods or services to either a physical or electronic address, as may be the case. According to a first embodiment, merchant 50 maintains and operates database 54 on which products are offered for sale to consumers, such as purchaser 10. Merchant server 52 is set-up to transmit product information 56 (i.e. through display on a website, PDA, or other equivalent electronic device). Merchant server 52 is also capable of transmitting purchase orders along with purchaser identifier 38 to processing system 100 in response to purchaser 10 commencing a purchasing procedure, as described further below.

With further reference to FIG. 3, merchant identifier 72 is associated with a merchant account 70, which may be maintained by processing system 100 (not depicted in FIG. 2), or any other account with a bank or other financial institution (as illustrated in FIG. 3), whereby processing system 100 credits merchant account 70 electronically.

Figure 4:
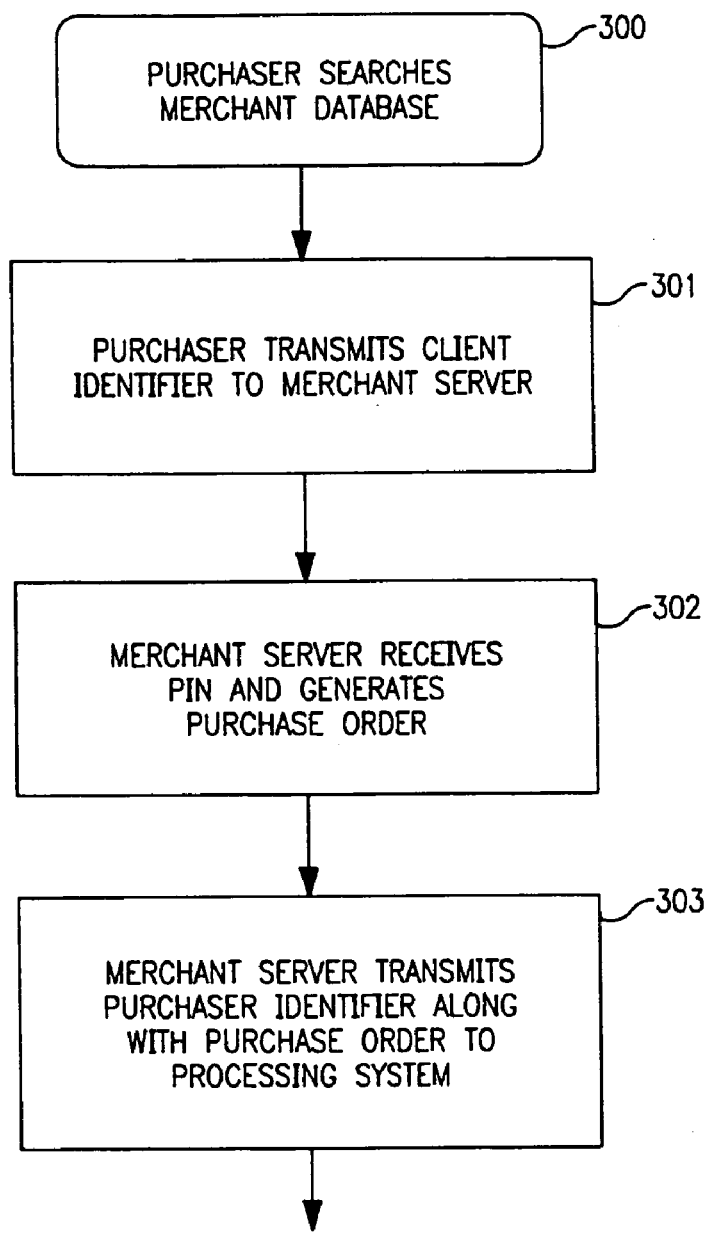
FIG. 4 is a flow diagram of an illustration of the steps of a preferred embodiment of the present invention.

With further reference to FIG. 4, which illustrates the exemplary steps of a first embodiment of a method of the present invention, in step 300, purchaser 10, using purchaser device 12, searches merchant database 54 through public network 200 for a particular product. One skilled in the art, however, will recognize, as more fully described below, that purchaser 10 may search for a product in a catalog, newspaper ad, or any other medium for communicating product information 56. Product information 56 is displayed on purchaser device 12 via public network 200. If purchaser 10 desires to purchase the product, purchaser 10 commences a purchasing procedure, as described below, and transmits purchaser identifier 38 to merchant 50 (step 301).

With respect to purchases made via the public network 200, the purchasing procedure is any e-commerce shopping solution known in the art and provided by merchant 50, such as, by way of non-limiting example, a shopping cart solution. In yet other embodiments, purchaser 10 can communicate purchaser identifier 38 to merchant 50 through a touch-tone telephone (hard-line or wireless) or PDA by pressing the corresponding keys and transmitting the data.

Upon receiving purchaser identifier 38, in step 302, merchant 50 groups purchaser identifier 38 with product information 56 into a purchase order, which is a data packet communicable via public network 200 to processing system 100. The purchase order includes purchaser identifier 38, product information 56, and merchant identifier 72. Once generated, the purchase order is transmitted to processing system 100 (step 303).

Figure 5:
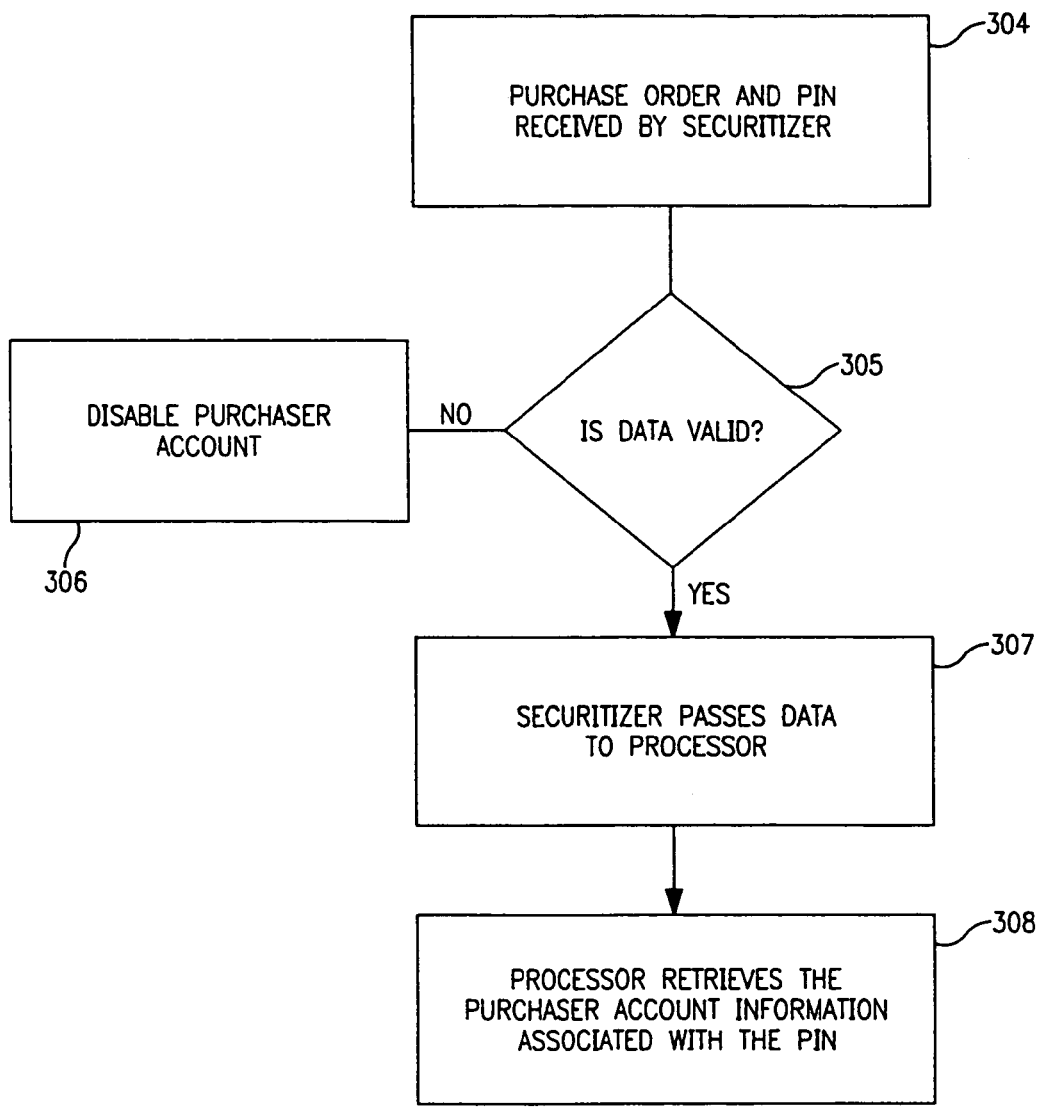
FIG. 5 is a flow diagram continuing the steps of FIG. 4.

With reference to FIG. 5, which continues the exemplary steps illustrated by FIG. 4, when processing system 100 receives the purchase order, securitizer 120, which acts as an Application Level Gateway, as described above, analyzes the purchase order according to its programming. If the purchase order meets the required security criteria as determined in step 305, securitizer 120 communicates the purchase order to processor 140 through secure network 180 (step 307). If, however, securitizer 120 detects hacking or other attempts at tampering, disabler 160 is triggered and purchaser account information 32 is disabled (step 306).

Again it is important to note that at no time during the ordering process has purchaser 10 been given the opportunity to select or change the address associated with delivery data 34. Thus, once the product is selected and identified, purchaser 10 need only input purchaser identifier 38 and review the purchase order to complete the sale.

Referring again to FIG. 5, under the control of processor 140 stored on storage device 103, processor 106 searches for purchaser account information 32 associated with the transmitted purchaser identifier 38. With further reference to FIG. 6, once purchaser account information 32 is located and retrieved, as in step 308, into the memory of data processor 106, data processor 106 verifies whether the payment device associated with payment data 36 indicates sufficient funds or credit, as the case may be, to complete the transaction (step 309). One skilled in the art will recognize, however, that payment data 36 may refer to a credit card, debit card, check card, checking or savings account, or any other equivalent means for transferring money from one party to another. If data processor 106 determines that sufficient funds or credit are present, data processor 106 completes the transaction (step 310) by debiting purchaser's account or processing purchaser's credit card using payment data 36 preparing payment to merchant account 70 via funds transfer. If processing system 100 maintains accounts for purchaser 10, i.e., acts as a bank or credit card fulfillment center, processor 140 deducts the purchase cost from purchaser's account to be credited directly to merchant account 70. Under control of processor 140, data processor 106 then communicates only delivery data 34 through securitizer 120 to merchant 50 (step 311). Using delivery data 34, merchant 50 may begin a shipping process necessary to deliver product 56 to purchaser 10. Because securitizer 120 is programmed to prevent certain types of information from being sent to public network 200, only delivery data 36 can be transmitted out of processing system 100.

If, however, processor 140 determines that purchaser 10 has insufficient funds as indicated by purchaser account information 32, merchant 50 and purchaser 10 are notified that purchase order has been denied (step 312).

As an added security feature to the present invention, the parties may agree on a return period in which purchaser 10 can freely return unwanted or fraudulently ordered products. The specific length of the return periods depends on the nature of the goods purchased, i.e. physical or electronic products, and the services provided.

Many different embodiments of the present invention are envisioned. The following is a non-exhaustive illustration of but a few of the potential uses of the present invention.

Credit Service

One skilled in the art will recognize that a Credit Card Company may utilize the present invention as a service to its card holders. Payment data 36, therefore, would simply be associated with purchaser 10's credit card number held by the Credit Card Company. In use, the Credit Card Company would only communicate delivery data 34 to merchants 50 in response receipt of a purchase order drawn on purchaser 10's payment data 36.

Such use of the present invention has the added advantage of permitting Credit Card Companies to decrease fraud by limiting the exposure of credit card numbers to electronic communication mediums which are often insecure.

Bill Payment Service

Purchaser 10 can place purchaser identifier 38 on file with utilities (i.e., gas and electric companies), mortgage companies, cable and internet service providers, telephone, or with any other entity that bills its customers on a recurring basis. Each month when the bill is due, the gas company, for example, would transmit purchaser identifier 38 to processing system 100. A confirmation of payment is transmitted only to the address associated with delivery data 34 so that purchaser 10 can verify the transaction.

Corporate Purchasing Application

Purchaser 10 may be a corporation having a purchaser account 32 with processing system 100. To eliminate having to give credit card numbers to employees needing to purchase office supplies, for example, corporate purchaser 10 can allow employees to use purchaser identifier 38 to make purchases. Because the purchases must be delivered only to the address associated with delivery data 34, fraudulent purchases on the corporate account are eliminated.

Phone and Catalog Shopping

In lieu of maintaining an Internet or other global network database, merchant 50 may desire to conduct business in a more traditional fashion, namely by mailing catalogs. Purchaser 10 desiring to purchase a product out of a catalog can phone (or otherwise transmit to) merchant 50 and communicate purchaser identifier 38. Merchant 50 then uses purchaser identifier 38 to request processing of the transaction.

One skilled in the art will recognize that the steps described herein are but one manner in which the present invention can be used and that the particular ordering of the steps is merely a matter of design choice. Further, many different configurations of the system architectures are possible and are a matter of design choice. Additionally, although the above examples are given in terms of software, the processing system may be hardwired as well to perform any or all of the functions.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

I claim:

1. A processing system for processing a secure purchase order between a purchaser and a merchant across a public network, the processing system comprising:

a purchaser account database including purchaser account information for each purchaser, the purchaser account information including at least a purchaser identifier that is any alpha-numeric code generated by the processing system during account setup and being inextricably linked to delivery data of said purchaser such that any change or attempted change to the delivery data will render the purchaser identifier inoperable for identifying a particular purchaser, payment data for effecting payment for purchased goods or services wherein the payment data is different from the purchaser identifier, and said delivery data associated with said purchaser identifier, said delivery data including at least one delivery address of said purchaser for fulfillment of the purchase order a processor capable of communication with the purchaser account database via a private network and further capable of communication via a public network with a merchant system for receiving the purchase order, said purchase order including at least a monetary amount for a good and said purchaser identifier and not including the payment data which is not transmitted to the merchant;

wherein, in response to receipt of the purchase order including the purchaser identifier, the processor retrieves the payment data and the delivery data from the purchaser account database on the private network corresponding to the purchaser identifier, transmits the delivery data to the merchant to fulfill the purchase order, and uses the payment data to pay for the purchased goods or services without exposing the payment data to the merchant; and wherein the merchant delivers the purchased goods or services to the purchaser using the delivery data.

2. The processing system of claim 1, wherein said delivery address is a physical address.

3. The processing system of claim 1, wherein said delivery address is an electronic address.

4. The processing system of claim 3, wherein said electronic address is an e-mail address.

5. The processing system of claim 1, wherein only one delivery address for a particular type of address is associated with the purchaser identifier.

6. The processing system of claim 1, wherein a disabler disables said purchaser identifier for a particular purchaser when either the purchaser identifier or the delivery data is altered.

7. The processing system of claim 1, further comprising a securitizer disposed between a secure network and the public network; and the secure network including the purchaser account database and the processor, and said securitizer preventing unauthorized access to said secure network.

8. The processing system of claim 7, wherein a disabler is operatively connected to said securitizer and said purchaser account information, said securitizer monitoring said processing system and determining if any alterations to said delivery data are being attempted and outputting a trigger to the disabler if said alterations are attempted, and the disabler disabling the particular purchase account information in response to the trigger.

9. The system of claim 8, wherein the disabler invalidates the purchaser identifier in response to the trigger.

10. The processing system of claim 1, wherein the public network is a mail and the merchant is a catalog company.

11. The processing system of claim 1, wherein the merchant is a utility company.

12. A transaction processing service system for facilitating the processing of a secure purchase order between a purchaser and a merchant across a public network, the processing service system comprising:

a processing system, including:
   a purchaser account database including purchaser account information for each purchaser, the purchaser account information including at least a purchaser identifier for identifying a particular purchaser and being generated by the processing system during account setup so as to be inextricably linked to a delivery address for use by the merchant to deliver a purchased good to the purchaser, and payment data for effectuating payment of the purchase order, and wherein the purchaser identifier is different than the payment data and cannot be used to make purchases except in connection with the transaction processing service system;
   the processing system being programmed to detect a change or attempted change in the delivery address linked to the purchaser identifier and, in response, render the purchaser identifier inoperable wherein, in order to make a purchase, the purchaser accesses a merchant's electronic store system and selects one or more goods for purchase and transmits the purchaser identifier to the merchant, the merchant's electronic store system submits a purchase order and the purchaser identifier to the processing system, and, in response to receipt of the purchase order including the purchaser identifier, the processing system retrieves the payment data and a delivery data from the purchaser account database on the a network corresponding to the purchaser identifier, transmits the delivery data to the merchant, and uses the payment data to pay for the purchased goods or services, and the merchant delivers the purchased goods or services to the purchaser using the delivery data; and wherein the payment data is not transmitted by the purchaser to the merchant and the processing system pays for the purchased goods without exposing the payment data to the merchant.

13. The transaction processing service system of claim 12, wherein said service system is operated by a credit card company.

14. The transaction processing service system of claim 12, wherein said service system is operated by a financial institution.

15. A method of facilitating secure transactions between a purchaser and a merchant across a public network wherein, in order to make a purchase, the purchaser accesses a merchant electronic store system and selects one or more goods for purchase and transmits a purchaser identifier to the merchant electronic store system, and the merchant electronic store system generates a purchase order including the purchaser identifier, comprising the steps of:

storing purchaser account information which includes at least payment data for paying for purchased goods and delivery data for delivery of the purchased goods to the purchaser;

generating the purchaser identifier so that the purchaser identifier is inextricably linked to the stored delivery data, and wherein the purchaser identifier is any alphanumeric code that is different from the payment data;

rendering the purchaser identifier inoperable in response to any change or attempted change in the stored delivery data;

receiving the purchase order including the purchaser identifier from the merchant electronic store system;

retrieving the delivery data and payment data associated with the received purchaser identifier;

effectuating payment for the purchased product using the payment data without exposing the payment data to the merchant; and communicating only the delivery data for the purchaser identified by the purchaser identifier to the merchant.

16. The method of claim 15, wherein the method further comprises prior to the step of effectuating payment, determining whether the identified purchaser can pay for the purchased product; and if said purchaser is not capable of paying, canceling the purchase order.

17. The method of claim 15, further comprising the step of invalidating the purchaser identifier if said delivery data is altered.

18. A method of facilitating secure transactions between purchasers and merchants across a public network, comprising the steps of:

at a purchaser system having access to a merchant store system:
   selecting a product offered for sale by the merchant, the product being associated with a product identifier;
   transmitting a purchaser identifier from the purchaser system to the merchant store system;

at the merchant store system:
   receiving the purchaser identifier;

generating a purchase order for the selected product that includes the purchaser identifier; and communicating the purchase order to a processing system; and at the processing system:

processing the purchase order to retrieve delivery data and payment data associated with the purchaser identifier;

wherein the purchaser identifier is any alpha-numeric code that is different from the payment data, and the purchaser identifier is inextricably linked to the delivery data such that if the delivery data is changed or attempted to be changed the purchaser identifier will be rendered unusable;

effectuating payment for the selected product without exposing the payment data to the merchant; and communicating the delivery data corresponding to the purchaser identifier to the merchant.

19. The method of claim 18, wherein said purchaser is not given an opportunity to change said delivery data.

20. A purchasing system for facilitating secure electronic transactions between a consumer and a merchant, wherein a secure consumer account is stored on the purchasing system and the account includes consumer payment information and at least one delivery address for delivering purchased items; the purchasing system comprising:

a communication connection to a merchant system via a network;

a server system operative with programming to:

receive a request for payment from the merchant system in response to an order placed by the consumer with the merchant to purchase items, wherein the request for payment includes a unique consumer identifier unrelated to the consumer payment information which is associated with the secure consumer account;

retrieve the consumer payment information from the consumer account associated with the unique consumer identifier and effectuate payment for the order to the merchant;

retrieve the delivery address from the consumer account associated with the unique consumer identifier and transmit the delivery address to the merchant computer for delivery of the purchased item; and wherein once the secure consumer account is established by the consumer and the unique consumer identifier is assigned to the consumer account, the at least one delivery address associated with the unique consumer identifier cannot be changed without causing the unique consumer identifier to be disabled.

21. The system of claim 20, wherein if the delivery address is changed and the unique consumer identifier is disabled, the consumer must be issued a new unique consumer identifier prior to making a purchase using the secure consumer account stored on the purchasing system.

22. The system of claim 20, wherein only a single delivery address is stored in the secure consumer account, such that purchased items can only be delivered to the single delivery address.

23. A purchasing system for processing a secure purchase order between a purchaser and a merchant across a public network, the purchasing system comprising:

a processing system residing on a private network and in communication with a purchaser computer and a merchant computer via the public network;

a purchaser account database in communication with the processing system via the public network private network;

the processing system programmed to:

receive from the purchaser computer purchaser account information including at least delivery data including at least one delivery address for the purchaser and payment data for effecting payment of purchased goods or services;

store the purchaser account information on the purchaser account database;

generate a purchaser identifier that is an alpha-numeric code having no monetary value and that is unrelated to any personally identifiable information of the purchaser; and link the purchaser identifier to the delivery data such that any change or attempted change to the delivery data will render the purchaser identifier inoperable; and in order to process a purchase order from the purchaser, the processing system further programmed to:

receive the purchase order, including order information and the purchaser identifier;

verify the purchaser identifier and retrieve the payment data and the delivery data corresponding to the purchaser identifier from the purchaser account database;

arrange for payment to be made to the merchant for the purchased goods or services without exposing the payment data to the merchant; and transmit only the delivery data and a payment authorization to the merchant to fulfill the purchase order, whereby the purchaser need not enter or transmit the payment data at any time to make a purchase.

* * * * *